United States Patent [19]
O'Boyle et al.

[11] Patent Number: 5,432,329
[45] Date of Patent: Jul. 11, 1995

[54] AUTOMATED HOLOGRAPHIC OPTICAL RECOGNITION AND DECODING SYSTEM FOR VERIFICATION

[75] Inventors: Lily O'Boyle, Peekskill, Gibert Colgate, Jr., both of N.Y.

[73] Assignee: American Bank Note Holographics, New York, N.Y.

[21] Appl. No.: 982,299

[22] Filed: Nov. 25, 1992

Related U.S. Application Data

[63] Continuation-in-part of Ser. No. 831,267, Feb. 7, 1992, Pat. No. 5,336,871.

[51] Int. Cl.⁶ .............................................. G06K 19/00
[52] U.S. Cl. .................................. 235/487; 235/454; 359/2
[58] Field of Search ................. 235/454, 468, 487; 359/2

[56] References Cited

U.S. PATENT DOCUMENTS

| | | | |
|---|---|---|---|
| 4,013,894 | 3/1977 | Foote et al. | 235/449 |
| 4,034,211 | 7/1977 | Horst et al. | 235/454 |
| 4,094,462 | 6/1978 | Moschner | 235/449 |
| 4,119,361 | 10/1978 | Greenaway | 359/2 |
| 4,211,918 | 7/1980 | Nyfeler et al. | 235/454 |
| 4,376,887 | 3/1983 | Greenaway et al. | 235/454 |
| 4,684,795 | 8/1987 | Colgate, Jr. | 235/457 |
| 4,788,420 | 11/1988 | Chang et al. | 235/483 |
| 4,816,657 | 3/1989 | Stockburger et al. | 235/454 |
| 4,855,584 | 8/1989 | Tominyama et al. | 235/493 |
| 5,059,776 | 10/1991 | Antes | 235/454 |

FOREIGN PATENT DOCUMENTS 136188  6/1986  Japan ................................ 235/468

*Primary Examiner*—John Shepperd
*Attorney, Agent, or Firm*—Longacre & White

[57] ABSTRACT

The present invention discloses a method of automatically decoding holographic signals by establishing an optical clock and performing subsequent optical signal analysis. In addition to a primary holographic image, the present invention comprises an optical image which generates a periodic pattern to create an optical clock for initializing the data reading device. By using a light source illuminating the optical image, diffraction signals are received by the detector(s). With a scanning (swiping) motion, signals of the optical clock and the primary image are read and the signals are processed and compared. The optical pattern can further be processed through an encryption algorithm and stored in a magnetic stripe, computer chip, hand held processor or a host computer for verification.

26 Claims, 8 Drawing Sheets

AUTOMATED HOLOGRAPHIC OPTICAL RECOGNITION AND DECODING SYSTEM FOR VERIFICATION

This application is a Continuation-in-part of U.S. utility application Ser. No. 07/831,267 to Gilbert Colgate filed on Feb. 7, 1992 now U.S. Pat. No. 5,336,871.

BACKGROUND OF THE INVENTION

1. Field of the Invention

This invention relates to a method of decoding optical signals used to establish the authenticity of credit cards, ID cards, drivers licenses and the like, by establishing an automated hologram verification system. To ensure accurate optical signal analysis, the instant invention comprises an optical clock which serves to initialize the optical decoding device. The decoding results in a verification process which accurately identifies the validity of a holographic code.

2. Description of the Prior Art

In the early days of credit cards, banks provided cards indiscriminately, and control of blank cards was lax. Consequently, there was an ample supply of blank credit cards with the banks' names on them which could be used by criminals. Additionally, the lack of security printing of these cards made it easy for criminals to manufacture their own counterfeit cards whenever a supply of genuine cards was not available, and this "business" enriched many.

As the losses to the banks escalated, the banks increasingly sought measures to tighten the issuance of cards to approved customers, and also to increase the security of the design and manufacturing of the card itself. A number of measures were considered, but it was the introduction of a piece of foil bearing a holographically generated diffraction grating upon the front of the card that virtually eliminated what was then the major source of cards for criminals—the counterfeited card. Unfortunately criminals are still left with at least three other major opportunities for fraud.

The first is the use of a stolen or lost card, or the interception of an issued card before it reaches the customer—which can be used until the holder reports it lost or stolen. The second was the use of a "good" account number re-encoded onto an otherwise outdated or lost, but previously valid card. The third is using a valid number (without the card) or a "white" card with magnetic stripe for use in automatic teller machines (ATM) or telephones where the card is not authenticated by a person, but only machine read. Actually, there is a fourth type of fraud about to reassert itself. The Master Card and Visa holograms have been used in the field for eight years. Soon there will be sufficient technology available for someone, somewhere to begin creating acceptable counterfeits. It is again time for the security printer to remain the proverbial one step ahead of the counterfeiter.

Technology can do little at present with respect to fraud of the first type. Although mailed cards may be kept invalid until the customer receives it and activates it by calling the issuing bank with information known only to the customer and the bank. However, the present invention can effectively enhance security against fraud of the second, third and fourth types.

In a typical credit card transaction a sales clerk looks at the card and, if it appears valid, swipes the card in a magnetic reader, such as that disclosed by Chang et al. (U.S. Pat. No. 4,788,420) and incorporated herein by reference. The reader sends the account access identification number back to the authenticating source. If the source responds with approval, a transaction takes place. Eventually the legitimate card holder receives a bill which he/she pays or disavows. If properly disavowed, eventually the bank will have to absorb the loss since the magnetic reader had provided an authentic account access identification number which was accordingly approved. This is what happens in fraud of the first and second types.

The account access identification number written or encoded into the magnetic stripe is very much like the license plate number of a car. There is not a great deal of information on the license plate, nor is there a great deal of information in the magnetic stripe. The really valuable information, the payment history, the maiden name of the customer's mother, etc. is all stored down stream in the bank's information system. Only the credit available is normally reached by enquiry from the field.

Thus the situation is similar to the automobile's license plate—or registration; not too much information is stored in the field, just a method of getting to the information stored in the Department of Motor Vehicle files.

Access to only a small part of the bank's information on a customer (current validity of the card, available credit) is made available to the merchant through the electronic network which is used every time a credit card is swiped or magnetically read by the equipment currently available to read and report a transaction.

While the supply of generally acceptable credit cards for illicit purposes is imperfect and small, it is still relatively easy for the determined criminal to acquire a physically genuine but outdated credit card and alter the magnetic information and also re-emboss the expiration date and names on the front. While the ironing out of the original name and re-embossing is not perfect and, upon close inspection can be determined by those familiar with such fraud, these mundane attempts to defraud are generally successful. Then, when the card is swiped, a credit worthy account is identified and the swipe machine is given a green signal to validate or authenticate the transaction.

In some cases, especially at an ATM the only thing the criminal needs is a blank card with a magnetic tape encoded with a valid magnetically readable account access identification number and the unsuspecting victim's personal identification number (PIN) number. There are also a number of places, telephone kiosks and supermarkets where PIN numbers are not required and clerk verification of the actual card is not done.

There has been a long and valiant attempt to make the magnetic encoding secure and resistant to alteration. Watermark TM tape by Thorne-EMI was one such. The development of high oersted tapes by 3M Company and others is another. Both provide some limited enhancement of security in their own ways. But neither has found acceptance in the industry because of the changes to existing procedures each might require.

The Thorne-EMI approach magnetically incorporates a sequential number into the tape while the tape is in the manufacturing process; this can then be read by the magnetic reader. The idea and process was thwarted by the difficulty of manufacturing the tape and by keeping sequential numbering accounted for; and it was generally deemed to be too expensive.

The 3M solution is a solution only to the extent that high coercivity tape requires more powerful encoding equipment than that used to encode 300 oersted tape (the industry standard). To the extent such equipment is harder to obtain, security is at least marginally enhanced. The industry may yet move to high coercivity tape. It would require all Service Bureaus and Banks with their own issuing departments to buy new encoding equipment at least to phase it in over time. This is a heavy investment of equipment by a group with no great incentive to do so and there is no indication such high coercivity encoding equipment would not be available to the criminal element. As stated this is, at best, a marginal move.

In all cases, whatever has been placed within the magnetic reading environment is obtainable to anyone with rudimentary equipment to read the magnetic encoding. What has been lacking in the past, and which this invention solves, is another—unreadable by conventional equipment—level of numbers which can be incorporated into the magnetic stripe in a cost effective way.

An approach to solving the problem already exists with the "batch" number which is printed on most credit cards by the card manufacturer. Most often these are four digit numbers found on all American Express Cards and now upon some Master Cards. If there is some reason to suspect a transaction is fraudulent, then the validity of the card can sometimes be tied into the actual card by telephoning the issuing bank to determine if the batch number is a) genuine and not stolen and b) if the magnetic information pertaining to a particular person on the card was matched to the batch number on the front of the card.

This is an imperfect and laborious way of determining fraud and is only done when the person offering the card appears to be out of character for the transaction—i.e., a teenager in dirty sneakers attempting to use a card to purchase a brand new automobile, or some such off-putting situation.

A further approach is developed by Tominyama et al. in U.S. Pat. No. 4,855,584 of Aug. 8, 1989. They developed a "double" read of the card in question by machine, rather than the above mentioned need to telephone in the data. However, in their approach one needs to hide the "certifying medium" by using a bar code which actually acts like a magnetic stripe. Not only is this improbable in practice but even if one discounted the need to have a "magnetic reader" read the bar code (printed as it is in magnetic ink, column 4, lines 30-39) and printed a bar code viewable only by an IR reader, the determined counterfeiter could decipher the underlying information.

All the criminal needs to do is copy the entire number. The problem is similar to attempting to create a visual security pattern or system which cannot be copied by a color xerox machine. As long as the human eye can see the security pattern so can the color copier. All sorts of attempts have been made to defeat the copier and at this writing all (short of the extremely cumbersome and impractical) have failed. The problem facing the authentication of the credit card is not quite so extreme and it does admit to a novel and very practical solution.

As previously stated, the hologram has been used as an effective security device in many applications such as credit cards, drivers licenses, high security labels and so on. The current credit card automated verification process simply check the information on the magnetic stripe through the phone line. This process does not prevent the counterfeiter from "skimming" a good card and forging cards to sell.

The hologram helped the credit card industry to stop fraud in the mid and late 1980's. The hologram is still one of the most secure devices in printing because it is extremely hard to simulate and counterfeit. Relying on the store clerk to check the hologram visually, however, is unreliable due to human error. To combine the well established magnetic stripe system with an automated hologram verification system is a logical answer for the mounting problem. The instant invention provides a security system which combines the auto-verification of the magnetic information with the holographic information in one swipe through a verification device.

SUMMARY OF THE INVENTION

It is the object of the present invention to provide a unique optical verification system for holographic products or a combination of holographic and non-holographic products.

It is further the object of the present invention to provide a unique security verification system capable of being based solely on optical media, thus eliminating the need for magnetic media.

It is further the object of the instant invention to provide an optical image reading method which ensures that the same data will be scanned with the same results each and every time the scanning takes place; thus enhancing the reliability of optical image reading.

It is further the object of the instant invention to establish an optical clock or signal initialization image, generated by a periodic pattern provided on the security document, in addition to a primary holographic image for an accurate and reliable optical verification method.

It is further the object of the instant invention to establish an optical clock such that the optical clock defines an optical starting signal and an optical ending signal which serve to further enhance the optical data recognition method of the present invention.

It is further the object of the instant invention to establish an optical clock signal as one of 1) an image plane holographic pattern, 2) an out of focus (background plane in 3D composition) holographic pattern, 3) printing with visible or invisible ink right on or near a primary hologram, or 4) demetalizing or partially metalizing of a holographic product with a clock pattern.

It is further the object of the instant invention to scan both the optical clock image and the holographic image and memorize the bits and bytes of this information as a unique pattern.

It is further the object of the instant invention to optically establish a clock pulse, based on the optical clock, which varies in relation to the speed and velocity with which the holographic product is scanned by a scanner. Thus, the optical clock defines reference units or primary image units. These reference units initialize the scanner with respect to the speed with which the image is passed through the scanner, thus ensuring that the primary holographic image is read with the same results each and every time.

It is further the object of the instant invention to transmit the digitized pattern through an encryption algorithm and store it in a magnetic media, a local processor or a host for verification.

DETAILED DESCRIPTION OF THE PREFERRED EMBODIMENT

Figure 1:
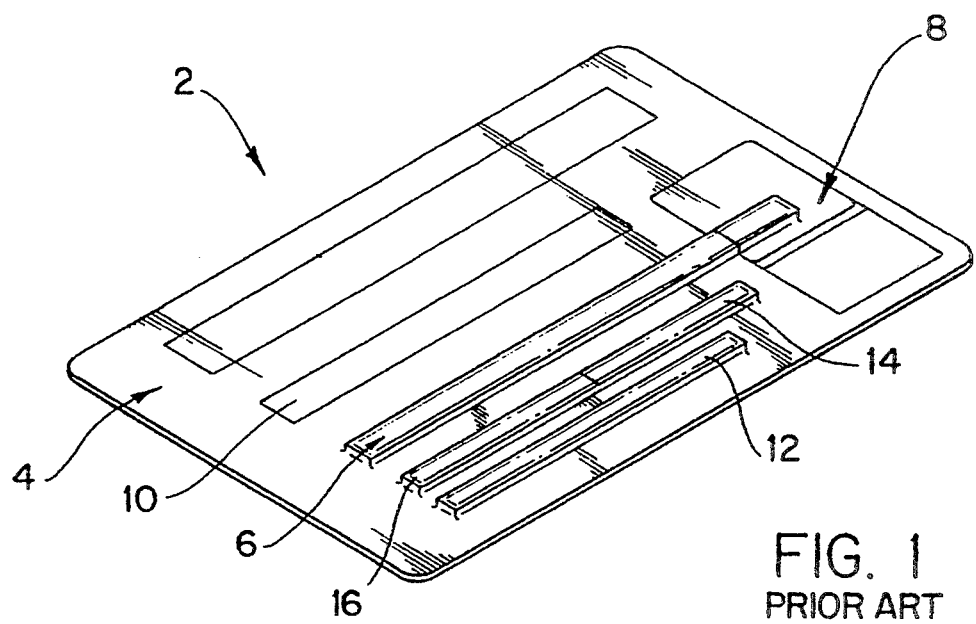
FIG. 1 shows the view of the front of a conventional credit card.
Figure 2:
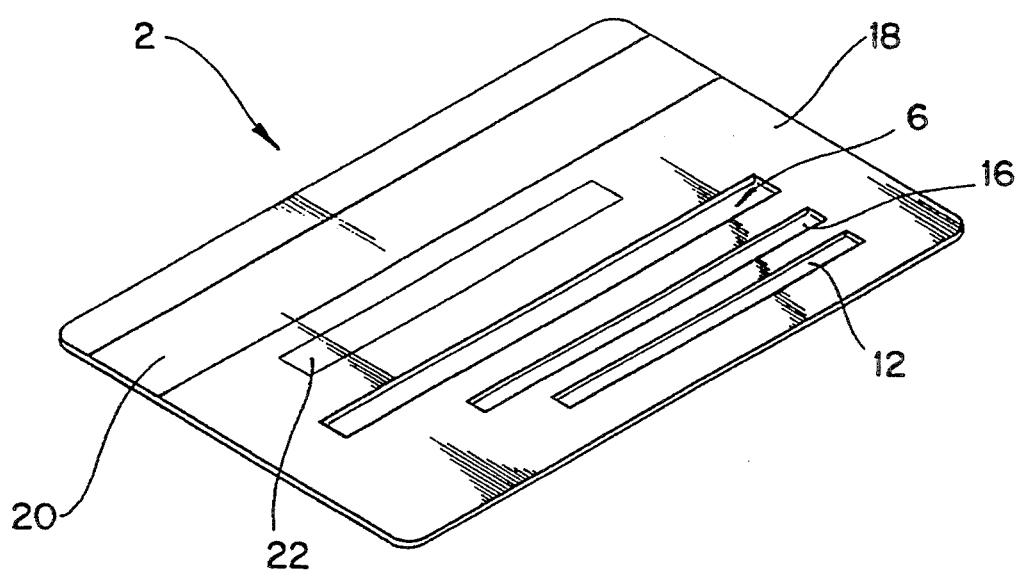
FIG. 2 shows a view of the back of a conventional credit card.

A previously known type of identification document is shown in FIGS. 1 and 2. A credit card 2 has a front side 4 including embossed alpha-numeric characters 6 for registering on standard merchant credit card forms, and a hologram 8. The hologram 8 provides a measure of security in so far as it is difficult to easily reproduce. Additionally, the front side 4 may have additional information printed on its surface which identifies the issuing bank, type of credit card, etc. and/or generally presents a graphical image. The embossed characters 6 generally include the bank account number 10, name of the individual to whom the card was issued 12, and date(s) for which the card is valid 14. The embossed characters 6 may or may not include other identifying information such as a batch number 16. FIG. 2 shows a back side 18 of the credit card 2 generally including a magnetic stripe 20 and an authorized signature panel 22. Like the face 4, additional information and/or graphics may be printed on the surface of the back 18.

In the past, the hologram 8 has been generally successful in discouraging all but the most dedicated criminal. The hologram 8 generally consisted of an image which is visually quite striking but contained no machine readable data, i.e. it relied upon visual inspection by a merchant to establish its validity.

Figure 3B:
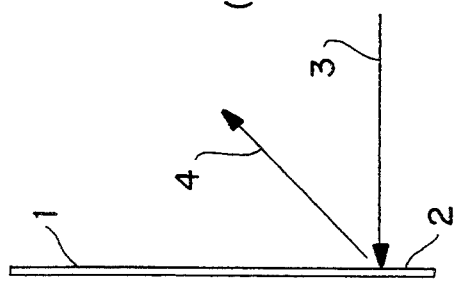
FIGS. 3a and 3b show prior art holographic products and the effects of light reflecting from the holographic geometry.
Figure 3A:
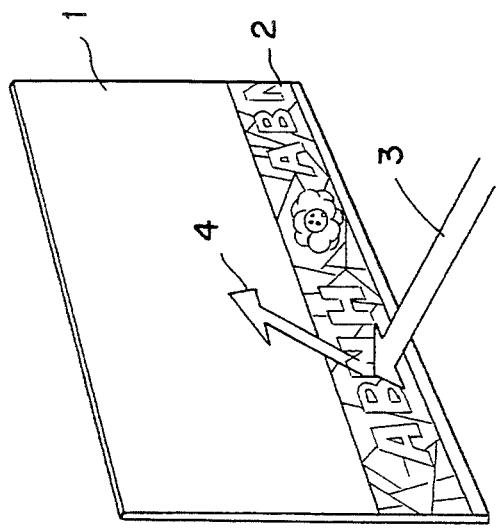

FIGS. 3a and 3b illustrate a conventional holographic product, as described in U.S. Pat. No. 4,684,795 to G. Colgate, wherein a holomag 2 (magnetic hologram) is disposed onto a credit card 1 or the like. When a store clerk swipes the card 1 through a verification device, the card 1 is read both magnetically and optically. Specifically, when an interrogation light source 3 impacts the holomag 2, a reflective holographic light signal(s) 4 is obtained which is capable of being detected by a suitable scanner.

While the product shown in FIGS. 3a and 3b provides enhanced security and validity verification, it should be noted that the instant invention may comprise a holographic image only, thus eliminating the need for a magnetic stripe and the processing equipment for the same.

Figure 4B:
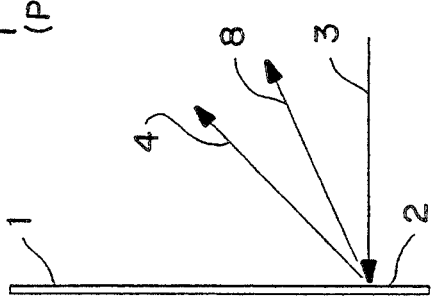
FIGS. 4a and 4b show the multi-reflective diffraction which results from a particular prior art holographic image.
Figure 4A:
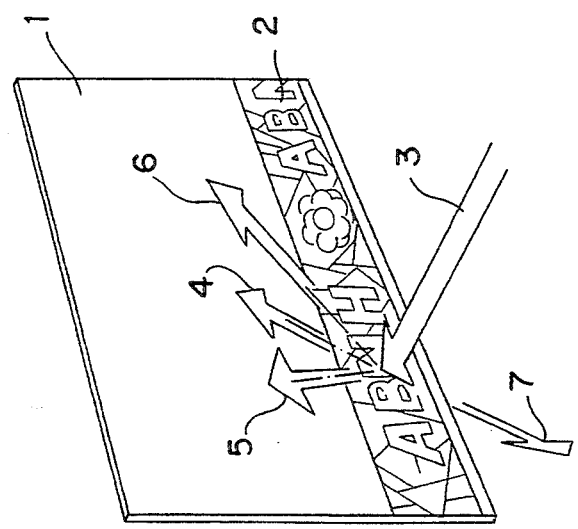

FIGS. 4a and 4b illustrate the multi-reflective diffractions obtained when a light source impacts a particular holographic recording geometry designed to scatter the reflected light signals. The complicated geometry of the hologram shown in FIG. 4a further enhances the security provided by the instant invention.

Figure 5:
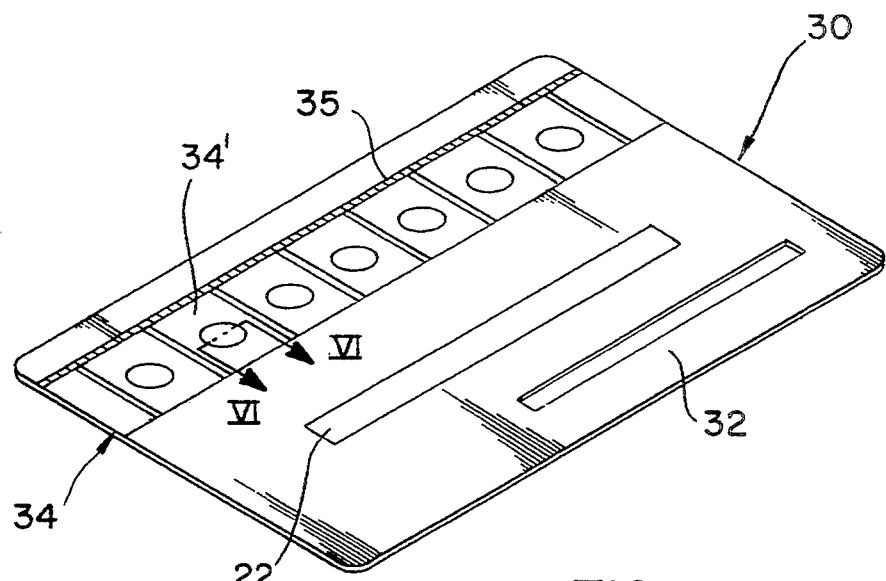
FIG. 5 shows a view of the back of a credit card according to the present invention with a stripe having machine readable magnetic and optical portions wherein an optical clock is proximate the primary optical image.
Figure 6:
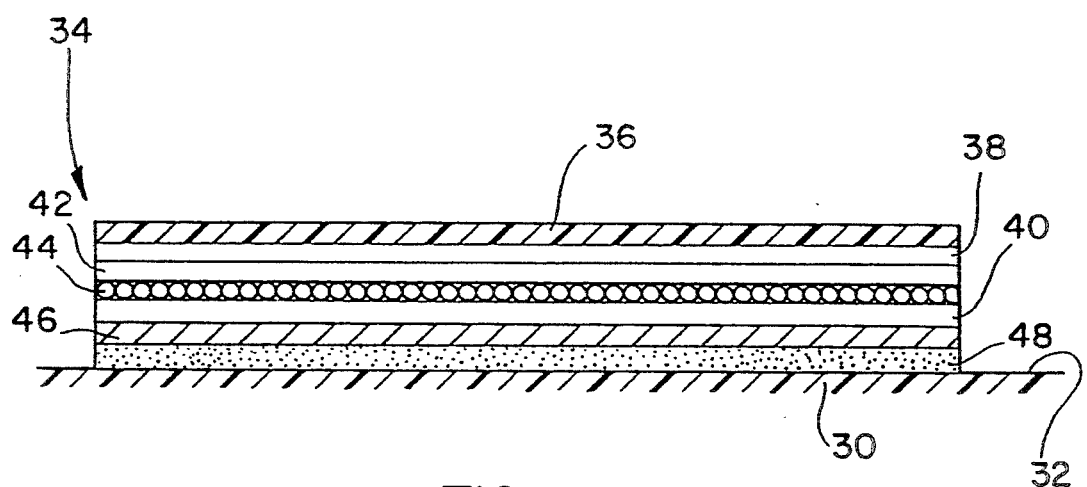
FIG. 6 shows a partial cross-section of the credit card of FIG. 5 along the line VI—VI.

A preferred embodiment of an identification document according to the instant invention is shown in FIGS. 5 and 6. A substrate 30, made for example from plastic or an equivalent material, has a face 32 including a holographic/magnetic stripe 34 (primary optical image) and an optical clock stripe 35. The holographic/magnetic stripe 34 is a laminated composition formed as follows. A clear plastic carrier 36, for example a one-half to one mil clear polyester, is coated with a release coating of a commercially available clear wax slipping compound 38. The slipping compound releasably secures a hologram 40 to the carrier 36 and, upon application of heat, releases the carrier from the hologram 40. Interposed between the hologram 40 and the slipping compound 38 is one or more coats of clear scuff 42 and, optionally, a coating of glass beads 44. The coat(s) of scuff 42 are relatively hard and are conventionally used to protect magnetic tape after fixation to a substrate. The coat of glass beads 44, a composition of clear lacquer incorporating beads typically less than 5 μm in diameter, acts such that when hit by light of certain radiation, the resultant radiation can be read and measured as a further test of the validity of the document. The hologram 40 is treated, for example with methyl-ethyl ketone, to facilitate adhesion of ferrous oxide 46. A high-density slurry of the ferrous oxide 46 is applied to the hologram 40 by a gravure coater. The ferrous oxide 46 is generally combined with an adhesive 48 which fixes the particles of ferrous oxide 46 when dry, and upon later application of heat provides the "glue" by which the holographic/magnetic stripe 34 permanently adheres to the substrate 30. The holographic/magnetic stripe 34 is fixed to the card by a hot stamping process which 1) activates the adhesive 48, and 2) allows the carrier 36 to be released from the hologram 40 via the slipping compound 38. The carrier 36, having performed its function of providing a base upon which to build the holographic/magnetic stripe, may be removed and discarded.

The ferrous oxide 46 stores encoded magnetic data and the hologram 40 stores encoded optical data. The hologram 40 is configured in either of two known arrangements for relinquishing the optical information. The first arrangement uses a portion of the hologram, for instance a particularly located square, to reflect a light source at a specific angle which is detected by an optical data reader and correlated with a numerical value. A known example of this technology can differentiate up to one thousand different numbers. The second possible arrangement uses the diffraction grating in a hologram to generate a bar code detectable in the presence of a light source by an optical data reader. The bar code could use a code 39 format or an Interleaved 2 of 5 format, for example.

Provided on the card is an optical clock stripe 35 which serves as a reference image for initializing the data reading terminal which detects and processes all stored information. The clock stripe 35 comprises a periodic pattern which is typically detected simultaneously with the primary holographic image. The periodic pattern of the stripe 35 not only serves as a reference for the data reading terminal but also defines an optical starting signal or feature and an optical ending signal or feature to further enhance the accuracy and reliability of the optical data recognition method of the present invention.

The optical clock stripe 35 as shown by example in FIG. 5 may be chosen from a number of known optical images. For example, the optical clock stripe 35 may be either an image plane holographic pattern or a non-imaging plane (e.g. background plane in 3D composition) holographic pattern. In addition, the optical clock may be formed with visible or invisible ink right on or near the hologram, or by demetalizing or partially metalizing a holographic product with a clock pattern suitable to initialize the scanner for reliable optical recognition. It should be noted that the optical clock image 35 need only be arranged to establish a periodic optical pattern whereby a clock pulse is created in order to define primary image units, thus is not limited to the arrangement shown in FIG. 5.

Once the optical clock signal has been established, the location of the primary image is then addressed. In most cases, the primary image will be a company logo or a special design, for instance a Dove for Visa or Globes for Mastercard. The location of the optical clock 35 and the primary image 34' is a design choice based on various factors including scanner design and maximization of document surface area. The arrangement shown in FIG. 5 situates the optical clock stripe 35 along the primary image stripe 34 upon which is located the primary image 34'. It should be understood that the illustrated arrangement of FIG. 5 is by way of example only, as the location of the primary and optical clock images is a design choice of one who produces security documents. As previously stated, the optical clock may comprise visible or invisible ink printed on or near the hologram. In addition, the primary hologram image maybe demetalized or partially metalized to achieved the verification method of the instant invention.

Once the primary image and the optical clock image have been established, the images are scanned and the bits and bytes of information are stored as a unique pattern. For increased security, the digitized pattern may be transmitted through an encryption algorithm and stored in a magnetic stripe, a local processor or a host processor for verification. Thus, creative encryption processes will make reverse engineering impossible.

Figure 6A:
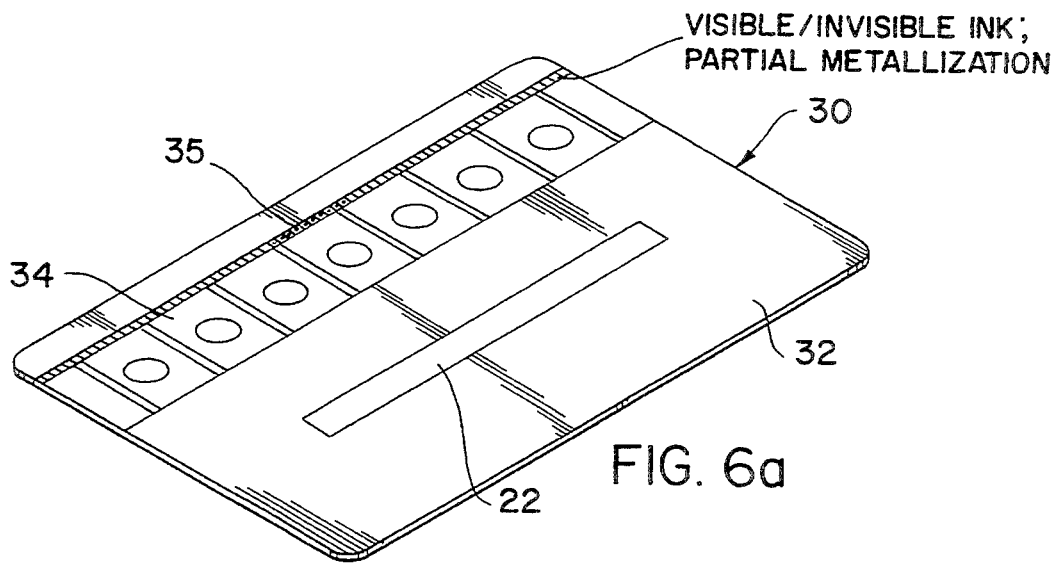
FIG. 6a illustrates the arrangement wherein coded data is provided on the carrier in the form of visible/invisible ink; or partial metalization to thereby provide a clock signal.
Figure 6B:
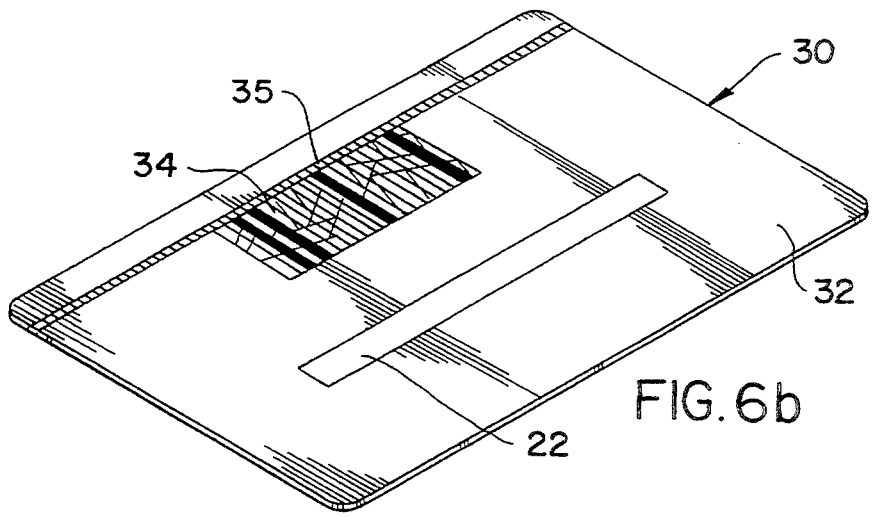
FIG. 6b illustrates a security document comprising a barcode coding a numerical digit as the primary optical image, and an optical clock defining an optical starting and optical ending signal.
Figure 6C:
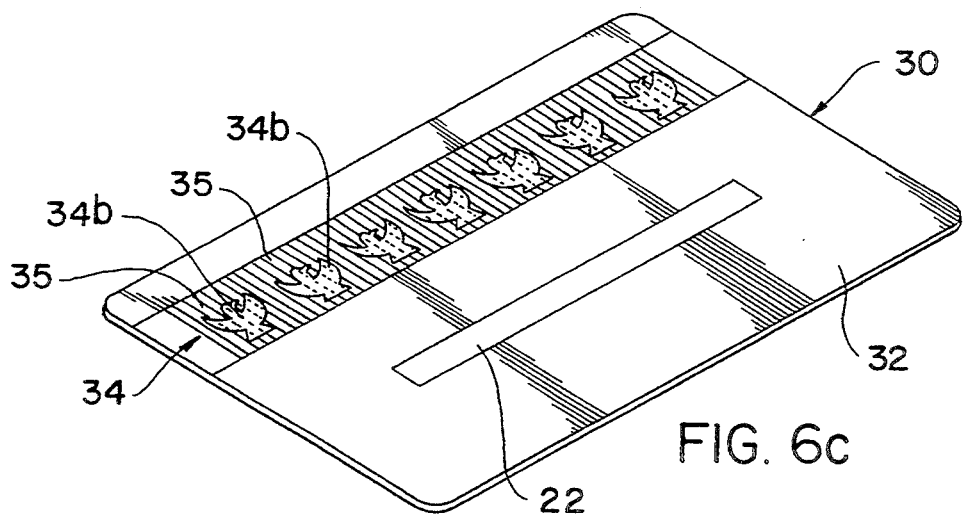
FIG. 6c illustrates a security document comprising a non-image plane holographic clock pattern along with an image plane hologram which share the same space on the security document.

FIG. 6a illustrates an arrangement wherein coded data is provided on the carrier in the form of visible/invisible ink or partial metalization. FIG. 6b illustrates a primary image 34 comprising a hologram of a barcode coding a numerical digit along with an optical clock which defines an optical starting signal and an optical ending signal. FIG. 6c illustrates a security document comprising a non-image plane or "out-of-focus" hologram as clock 35. In addition, the primary optical image 34 is formed of image plane type holograms 34b which share the same space with the clock image 35.

Figure 7:
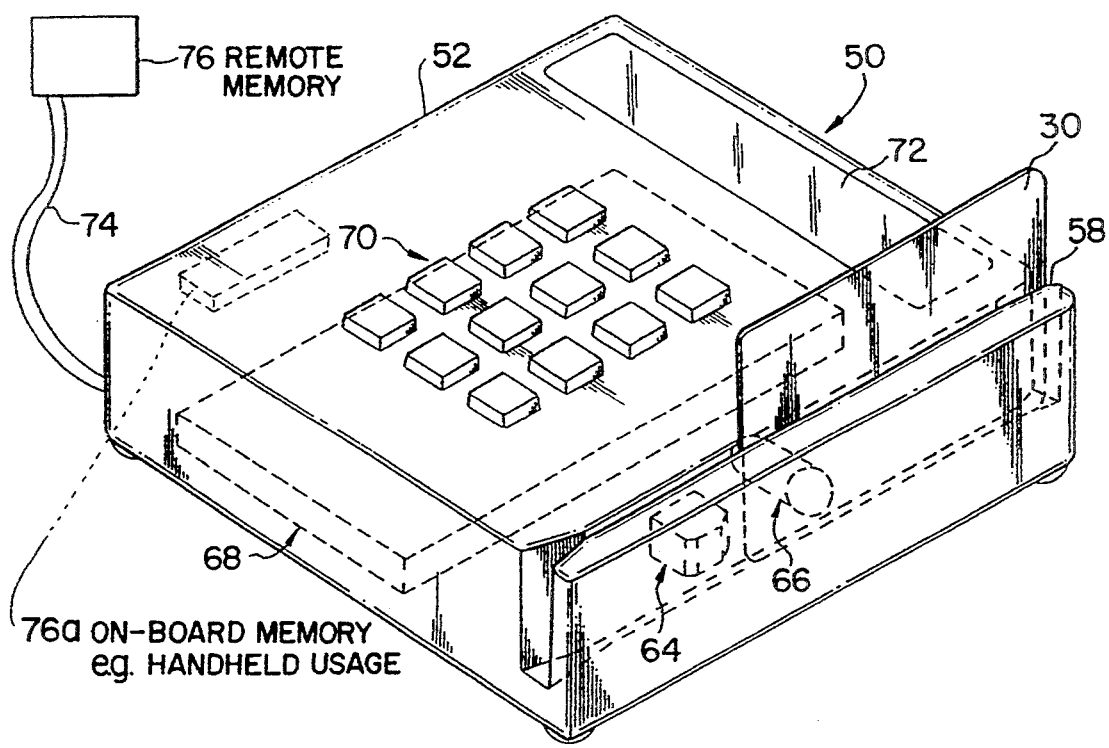
FIG. 7 shows a perspective view of a machine reading both magnetic and optical portions.

FIG. 7 shows a data reading terminal 50 which is particularly advantageous for point of sale credit verification applications. The terminal 50 includes a case 52 which defines an integral document slot 58 which extends along the right hand side of the cover 52. The cover 52 defines the sidewalls as well as the bottom wall of the slot 58. A magnetic read head 64 is mounted in an aperture in one of the sidewalls for detecting magnetic data encoded on a document's holographic/magnetic stripe 34 and optical clock 35 as the document is swiped past the magnetic read head 64. An optical data reader 66 is mounted in another aperture in one of the sidewalls for detecting optical data encoded on a document's holographic/magnetic stripe 34 as the document is swiped past the optical data reader 66. A second optical data reader 66a may also be provided depending on the number and arrangement of the otpical images to be detected. The electronic output of the magnetic read head 64 and the optical data reader 66 and 66a is sent to circuitry 68 for processing as will be described in greater detail below. The terminal 50 also includes a keypad 70 for manual data input, a display 72 for presenting data, and a data link 74, for example a telephone line, for connecting the terminal to a remotely located data bank 76. It should be noted that the data bank 76 may be located within the terminal 50 in the form of a computer chip 76a to enhance the portability of the data reading terminal.

Figure 8:
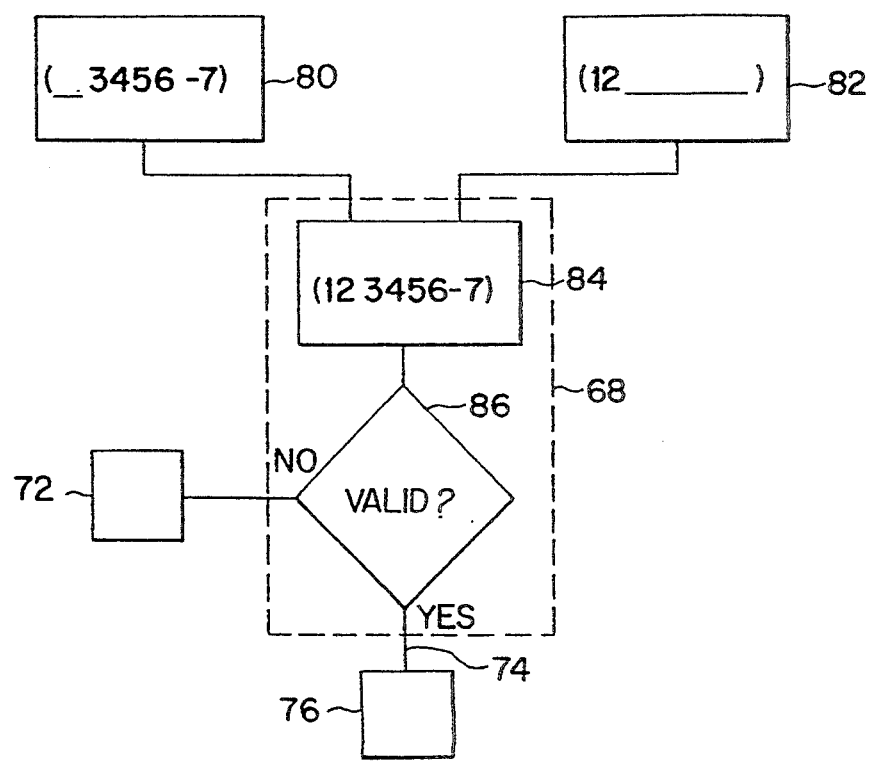
FIG. 8 shows a block diagram of the method of authenticating a credit card according to the present invention.

FIG. 8 is a flow diagram indicating one method by which the holographic/magnetic stripe 34 is read and the data contained thereon used to access the data bank 76. A document, for example an identification card, is swiped through the slot 58 in the terminal 50 such that the holographic/magnetic stripe 34 passes in front of both the magnetic read head 64 and the optical data reader 66. As shown at 80, the magnetic read head 64 detects the magnetic portion of the data present on the document. For example, this data may represent a portion of an account access identification number (12 3456-7) and check digit(s) (12 3456-7). As shown at 82, the optical data reader 66 concurrently detects the optical portion of the data present on the document. Continuing with the example, this data may represent another portion of the account access identification number (12 3456-7). As shown at 84, the circuitry 68 links the signals from the magnetic read head 64 and the optical data reader 66, resulting in a complete account access identification number with check digit(s) (12 3456-7). As shown at 86, the account access identification number is mathematically manipulated and the result compared to the check digit to establish the validity of the document. If the account access identification number is valid, communication along the data link 74 is established between the terminal 50 and the data bank 76. If the account access identification number is invalid, an appropriate indication of such is given on the display 72.

While FIG. 8 illustrates one embodiment of the instant invention, it should be understood that the security document of the instant invention may contain only optical data comprising a primary holographic image and an optical clock. The unique concept of using an optical clock allows a code to be developed without using any magnetic media.

The reading method of the instant invention is similar to known barcode reading methods. Typically, barcodes are read with a reflection or transmission mode. Based on the amount of light reflected or transmitted onto the detector, the logic will determine that the area is dark or light and then translate this data into 0s and 1s. For the instant invention, light signals from a first order holographic diffraction or refraction are detected by a scanner and these signals are translated into 0s and 1s in a manner similar to barcode decoding processes.

Figure 9:
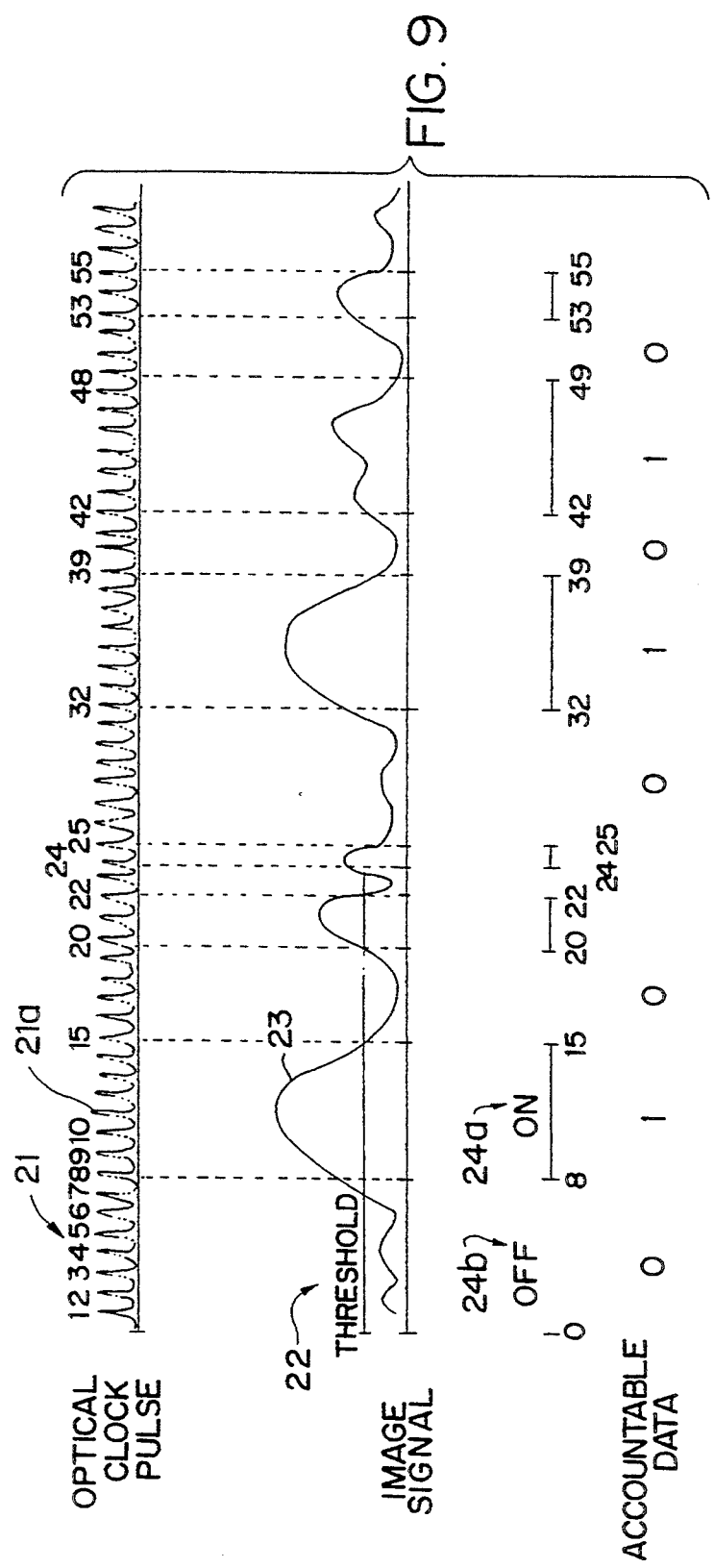
FIG. 9 is a graphical chart representing the image signal analysis of the optical clock pulse and primary optical information according to the present invention.

The following is a description of the encoding operation of the automated holographic optical recognition and decoding system of the present invention. In operation, as one swipes the card 30 through the scanner 50, the hand motion of the operator varies in speed in an unpredictable manner. With reference to FIG. 9, the signal detected by the optical data reader 66 results in an optical clock pulse 21. This clock is used to define primary image units 21a arranged in a set periodic pattern which serve to initialize the optical reading device 50 so as to compensate for variations in the scanning speed.

Figure 10:
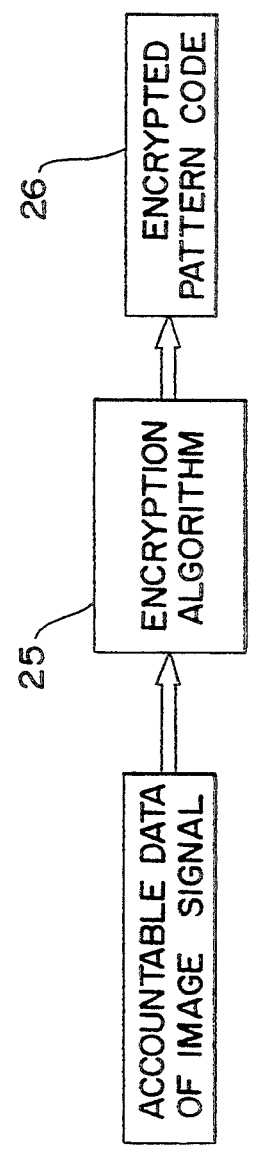
FIG. 10 shows a flow chart representing the encryption algorithm data manipulation of the instant invention.

As shown in FIG. 9, for a detected set of image units 21a, a threshold 22 is set to determine whether the signal is "on" 24a or "off" 24b. Each determination of an "on" signal 24a is then labeled as accountable data and assigned the logic numeral 1. Similarly, each determination of an "off" signal 24b is labeled as accountable data and assigned the logic numeral 0. The sequence of logical numerals (0s and 1s) defines an accountable image. This accountable image comprises the accountable or verification data at the heart of the present invention. Once an accountable image is registered in a respective address, the data can be manipulated with an encryption algorithm 25 as shown in FIG. 10. Without a clock reference as taught by the present invention, it is very difficult to scan the same data with the same result each and every time. This difficulty results from the variations in "swiping" motions of a store clerk, for example, who scans a card through a data reading terminal.

FIG. 10 provides a flow chart representing the above referenced data manipulation. The accountable data (0s and 1s) which forms the accountable image is sent to block 25 wherein the data is manipulated by an encryption algorithm to form the encrypted pattern code 26. This pattern code 26 is stored in an appropriate storage system for verification of the optical image. Thus, security is enhanced and reversed engineering is made virtually impossible.

Figure 11A:
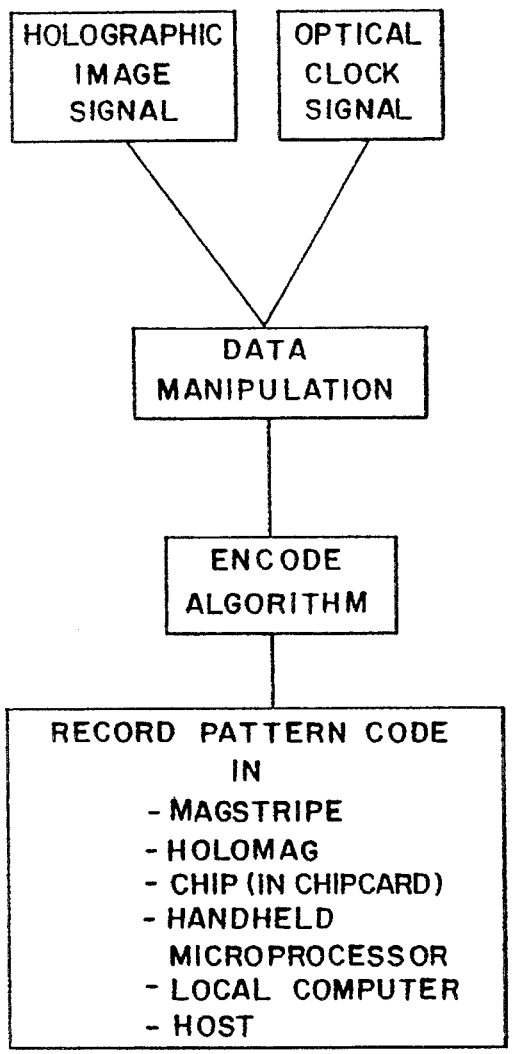
FIG. 11a shows a flow chart of the optical encoding method of the instant invention.
Figure 11B:
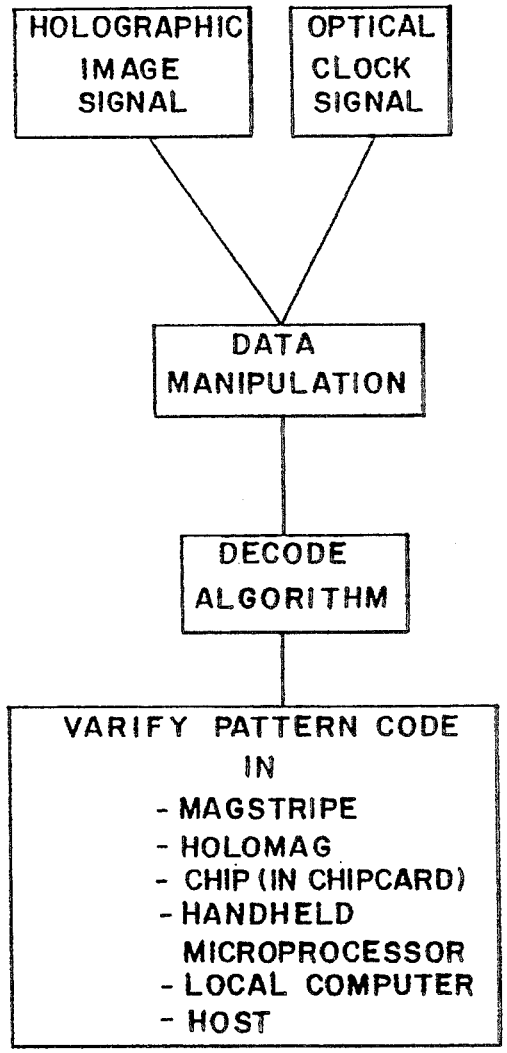
FIG. 11b shows a flow chart of the optical decoding method of the instant invention.

The following is a discussion of the specific encoding and decoding procedures set forth by the instant invention and shown in flow chart form in FIGS. 11a and 11b.

Encoding is accomplished by feeding or swiping the card or security document shown in FIG. 5 through an encoder which is capable of encoding magnetic and optical information. Specifically, when a card or document carrying magnetic and/or optical information is scanned, the optical clock signals and the primary holographic signals are simultaneously detected by the detector(s) of the type shown in FIG. 7. These signals are independent of the magnetic clock. Based on the alignment of the holographic image signal and the clock pulse, the image is digitized by recording the accountable data.

Once the information has been digitized, the data is manipulated by an encryption algorithm to enhance security by eliminating the effectiveness of reverse engineering. This step results in an encrypted code as shown in FIG. 10.

At this point, the encrypted code is stored in a designated location for use in the verification process when the card is again scanned. The encrypted code may be stored in a wide range of locations including: 1) a magnetic or holomagnetic stripe or other magnetic media; the merit of this arrangement is that the communication link to other memory banks is eliminated; 2) a chip in a card chip—similarly, for this arrangement, external linkage is not required except that the code storage is in the chip rather than the magstripe; 3) a handheld microprocessor wherein the pattern code is stored in the handheld processor itself—this is suitable for smaller data files and when necessary it can be linked to a central file by known means; this is particularly useful for any file management or verification process which requires mobility; 4) a computer or host wherein the encrypted code is stored in the central memory of a bank or processing center.

Decoding is accomplished by scanning the card or security document in an appropriate scanner wherein the magnetic and/or optical information is detected in the same manner as the encoding process.

The scanned information is then processed by the same manipulation and algorithm as used in the encoding step to obtain a set of encoded data.

Next, this encoded data is compared to the encrypted code previously stored in the designated storage area. If the two code match, then the card or security document is determined to be valid.

Each card or security document, therefore, has adequate distinction as the chance of matching optical patterns and resolving the same code after the encryption process is very unlikely. The security method of the instant invention may be further enhanced by the marriage of both optical and magnetic information encoded in the document.

If the code is stored in the magstripe, holomag, the chip or the handheld processor, the verification can be accomplished within the reader. If the code is stored in the local computer or host, all verification must be processed through the central computer via communication link, and authorization is sent from the central computer. The method described above offers the most accurate data update and higher protection against illegal access.

The method and apparatus of the present invention is particularly effective in fighting fraud against the never received issues (NRI), the fastest growing credit card crime in the United States. All holomag cards and other holographic products which are designed to be used in this system have specially designed characters, therefore have their own unique pattern code. The encoded data recorded during the aforementioned encoding process may be transferred to a central computer. When a new or replacement credit card is being issued, the computer has the old code and the new code for each valid card holder stored within its memory. Upon receiving the new card, the legitimate card holder telephones the issuing bank to activate the new card. The telephone could, for instance, be linked to an auto-dialing system and entering a "PIN" number or other secret information initiates the use of the new card and invalidates the old card. Thus, if the card should be intercepted, the card cannot be used illegally in any point of sales where the opti-mag verification system is used.

Figure 12:
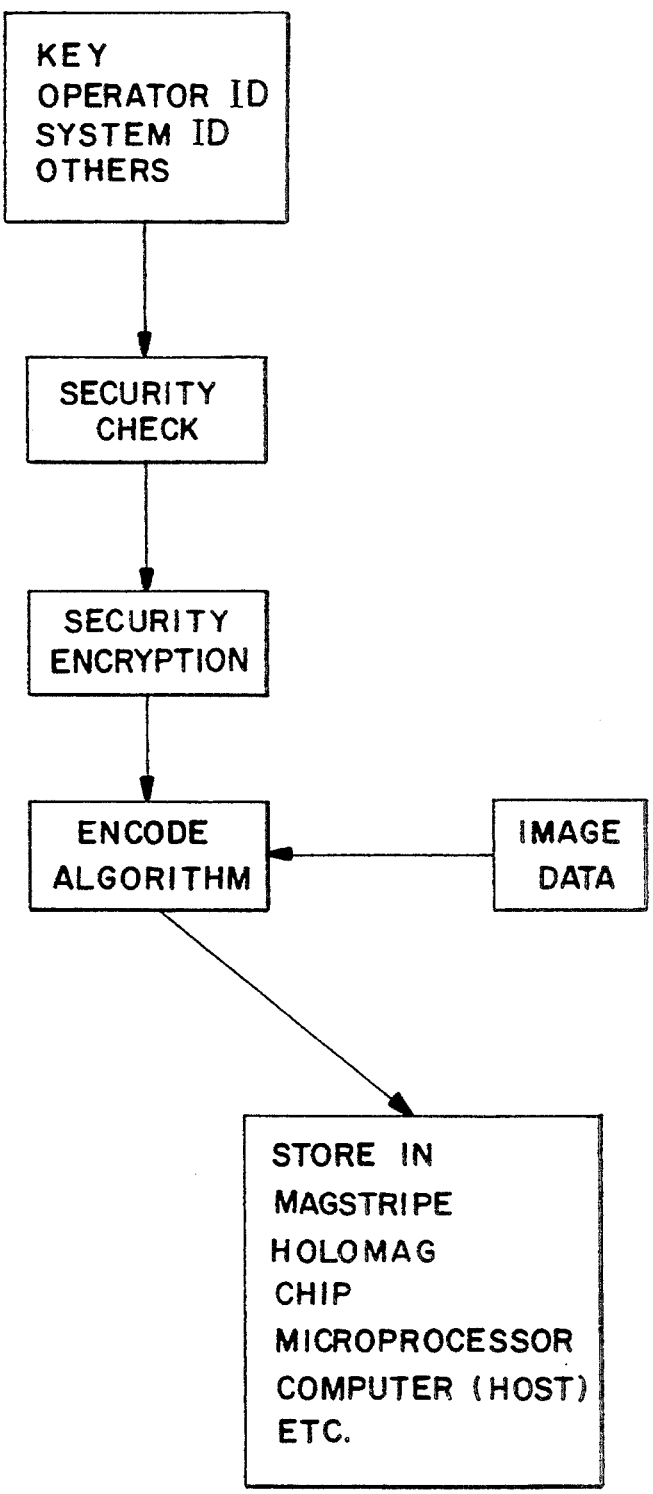
FIG. 12 shows a flow chart representing the access control method in the encoding system of the present invention.

To make the system even more secure, one can utilize very secure access control methods in the encoding system as shown in FIG. 12. Because current encoders or readers can be purchased very easily; as the cost of a system may be as little as several hundred dollars, the skimming and counterfeiting of security documents utilizing optical and magnetic information has grown rapidly, especially in the Far East. By setting up a stringent access procedure, the source of every card may be effectively tracked, ie, where the card is made, which system it came from and who is the operator. If necessary, all of this information could be encrypted in the coded data.

The credit card market is only one of the areas that can benefit from this invention. Other holographic products could implement this invention as a more complete security system. High quality product holographic hang tags, nonnegotiable or negotiable instruments (e.g. checks) with a holostripe, intellectual product (e.g. software, video etc.) packaging with a hololabel, a passport with hololabel or laminent, ID badges with holomag or label, transit pass with holomag or laminents and high security documents are examples of such holographic products.

The unique concept of using the optical clock allows a code to be developed without using any magnetic media. For example, "hang tags" without magnetic media may be passed through the optical scanning system to identify the item as if it were a bar code, which it can conceivably replace. As long as the host computer has been alerted to the particular optical codes recorded and stored, then an inventory trail can be created solely from the holographic aspects of the invention. Thus, the validity of airline tickets, checks or similar documents may be determined without the use of magnetic media.

The preferred embodiments described and shown are illustrative but not limitative and can easily be modified and varied by those skilled in the art without departing from the spirit and scope of the present invention which is considered to be defined in the appended claims.

We claim:

1. A security document comprising;
    a carrier;
    a primary optical image provided on said carrier, said primary optical image adapted to define a first set of coded, machine readable data, wherein said primary optical image comprises a hologram of a bar code coding a numerical digit; and
    an optical clock affixed to said carrier, said optical clock comprising a reference image formed as a periodic pattern on said carrier, whereby said optical clock is adapted to initialize a data reading terminal to accurately read said coded, machine readable data, wherein said primary optical image and said optical clock comprise preset information defining a preset optical arrangement upon affixation to said carrier.

2. A security document according to claim 1, further comprising a magnetic stripe mounted on said carrier and having a second set of coded, machine readable data.

3. A security document according to claim 2, wherein said primary optical image forms part of said magnetic stripe.

4. A security document according to claim 1, wherein said carrier is a plastic embossed document.

5. A security document according to claim 1, wherein said optical clock comprises visible ink printed on or near said primary optical image.

6. A security document according to claim 1, wherein said optical clock comprises invisible ink printed on or near said primary optical image.

7. A security document comprising;
    a carrier;
    a primary optical image affixed to said carrier, said primary optical image adapted to define a first set of coded, machine readable data,
    an optical clock affixed to said carrier, said optical clock comprising a reference image formed as a periodic pattern on said carrier, whereby said optical clock is adapted to initialize a data reading terminal to accurately read said coded, machine readable data, wherein said optical clock comprises an image plane holographic pattern.

8. A security document comprising;
    a carrier;
    a primary optical image affixed to said carrier, said primary optical image adapted to define a first set of coded, machine readable data,
    an optical clock affixed to said carrier, said optical clock comprising a reference image formed as a periodic pattern on said carrier, whereby said optical clock is adapted to initialize a data reading terminal to accurately read said coded, machine readable data, wherein said optical clock comprises an out of focus holographic pattern having a background plane in three-dimensional composition.

9. A security document comprising;
    a carrier;
    a primary optical image affixed to said carrier, said primary optical image adapted to define a first set of coded, machine readable data,
    an optical clock affixed to said carrier, said optical clock comprising a reference image formed as a periodic pattern on said carrier, whereby said optical clock is adapted to initialize a data reading terminal to accurately read said coded, machine readable data, wherein said optical clock comprises partial metalization of said primary optical image, said partial metalization adapted to define said periodic pattern and be read by said data reading terminal.

10. A method of optical data recognition for a security document comprising the steps of:
    providing onto said document a predefined reference image comprising a periodic pattern, said periodic pattern defining an optical clock and adapted to be detected by a data reading terminal,
    providing onto said document a predefined primary optical image comprising a first set of machine readable data, said primary optical image adapted to be detected by said data reading terminal, whereby said reference image defines a holographic pattern which initializes said data reading terminal to consistently read said primary optical image.

11. A security document according to claim 10 further comprising the steps of encoding said reference image and said first set of coded, machine readable data, said encoding step comprising detecting said reference image and said first set of coded, machine readable data, and, based on the alignment of said reference image and said first set of coded, machine readable data, digitizing and/or registering alignment information with respect to a given address in a memory location as coded information.

12. A method according to claim 11 further comprising the step of decoding said reference image and said first set of coded, machine readable data, said decoding step comprising detecting said reference image and said first set of coded, machine readable data, and comparing said detected reference image and readable data with said coded information, whereby if said detected reference image and readable data match said coded information, the document is verified as valid and if said detected reference image and readable data do not match said coded information, the document is verified as invalid.

13. A method according to claim 12 wherein said decoding step further comprises a data manipulation step wherein said reference image and said readable data are manipulated by an encryption algorithm prior to being compared to said coded information.

14. A method according to claim 11 wherein said encoding step further comprises a data manipulation step wherein said reference image and said readable data are manipulated by an encryption algorithm prior to being stored as coded information.

15. A method according to claim 11 wherein said memory location comprises a magnetic or holographic magnetic stripe whereby a communication link to a memory bank separately located with respect to said data reading terminal is eliminated.

16. A method according to claim 11 wherein said memory location comprises a computer chip located in said data reading terminal whereby a communication link to a memory bank separately located with respect to said data reading terminal is eliminated.

17. A method according to claim 11 wherein said memory location comprises a handheld microprocessor.

18. A method according to claim 11 wherein said memory location comprises a central memory bank adapted to receive a plurality of signals from a plurality of data reading terminals.

19. A method according to claim 10 further comprising the step of providing onto said document magnetic information adapted to be read by said data processing terminal for further enhancing the security of said document.

20. A method according to claim 10, wherein said reference image comprises an image plane holographic pattern.

21. A method according to claim 10, wherein said reference image comprises an out of focus holographic pattern having a background plane in three-dimensional composition.

22. A method according to claim 10, wherein said reference image further defines an optical starting signal and an optical ending signal whereby the reliability of said optical data recognition method is enhanced.

23. A method of optical data recognition for a security document comprising the steps of:
providing onto said document a reference image comprising a periodic pattern, said periodic pattern defining an optical clock and adapted to be detected by a data reading terminal,
providing onto said document a primary optical image comprising a first set of machine readable data, said primary optical image adapted to be detected by said data reading terminal, whereby said reference image initializes said data reading terminal to consistently read said primary optical image, wherein said reference image comprises partial metalization of said primary optical image, said partial metalization adapted to define said periodic pattern and be read by said data reading terminal.

24. A security document comprising:
a carrier;
a primary optical image affixed to said carrier, said primary optical image adapted to define a first set of coded, machine readable data,
an optical clock affixed to said carrier, said optical clock comprising a reference image formed as a periodic pattern on said carrier, whereby said optical clock is adapted to initialize a data reading terminal to accurately read said coded, machine readable data, wherein at least a portion of one of said optical clock and said primary optical image is superimposed on the other of said optical clock and said primary optical image.

25. A security document comprising;
a carrier;
a primary optical image provided on said carrier, said primary optical image adapted to define a first set of machine readable data,
an optical clock provided on said carrier, said optical clock comprising a reference image formed as a periodic pattern on said carrier, wherein said optical clock defines an optical starting signal and an optical ending signal, said optical starting signal being read by a data reading terminal prior to said primary optical image, and said optical ending being read by said data reading terminal after said primary optical image, whereby said optical clock defines a beginning and an end of said primary optical image,
wherein at least a portion of one of said optical clock and said primary optical image is superimposed on the other of said optical clock and said primary optical image.

26. A method of optical data recognition for a security document comprising the steps of:
providing onto said document a reference image comprising a periodic pattern, said periodic pattern defining an optical clock and adapted to be detected by a data reading terminal,
providing onto said document a primary optical image comprising a hologram of a bar code coding a numerical digit, said primary optical image adapted to be detected by said data reading terminal, whereby said reference image initializes said data reading terminal to consistently read said primary optical image.

* * * * *